US006339732B1

(12) United States Patent
Phoon et al.

(10) Patent No.: US 6,339,732 B1
(45) Date of Patent: Jan. 15, 2002

(54) APPARATUS AND METHOD FOR STORING, TRACKING AND DOCUMENTING USAGE OF ANESTHESIOLOGY ITEMS

(75) Inventors: Florence H. Phoon; Christopher G. Ross, both of San Diego, CA (US); Steven W. Chang, Chandler, AZ (US); Thomas E. Radziminski, San Diego, CA (US); Paula A. Richter-Dycaico, San Diego, CA (US); Michael Kurtz, San Diego, CA (US)

(73) Assignee: Pyxis Corporation, San Diego, CA (US)

( * ) Notice: Subject to any disclaimer, the term of this patent is extended or adjusted under 35 U.S.C. 154(b) by 0 days.

(21) Appl. No.: 09/174,205

(22) Filed: Oct. 16, 1998

(51) Int. Cl.[7] .............................................. G06F 17/00
(52) U.S. Cl. ...................................................... 700/237
(58) Field of Search ................................ 700/215, 225, 700/236, 237, 241

(56) References Cited

U.S. PATENT DOCUMENTS

| | | | | | |
|---|---|---|---|---|---|
| 4,518,208 | A | * | 5/1985 | Marder | 312/209 |
| 4,717,042 | A | | 1/1988 | McLaughlin | 221/3 |
| 4,847,764 | A | | 7/1989 | Halvorson | 700/231 |
| 4,967,928 | A | | 11/1990 | Carter | 221/2 |
| 5,014,875 | A | * | 5/1991 | McLaughlin et al. | 221/2 |
| 5,292,029 | A | | 3/1994 | Pearson | 221/2 |
| 5,445,294 | A | | 8/1995 | Gardner et al. | 221/1 |
| 5,460,294 | A | | 10/1995 | Williams | 221/2 |
| 5,490,610 | A | | 2/1996 | Pearson | 221/2 |
| 5,520,450 | A | | 5/1996 | Colson, Jr. et al. | 312/215 |
| 5,562,232 | A | | 10/1996 | Pearson | 221/7 |
| 5,564,803 | A | * | 10/1996 | McDonald et al. | 312/215 |
| 5,571,258 | A | | 11/1996 | Pearson | 221/211 |
| 5,673,983 | A | * | 10/1997 | Carlson et al. | 312/218 |
| 5,716,114 | A | | 2/1998 | Holmes et al. | 312/215 |
| RE35,743 | E | | 3/1998 | Pearson | 221/2 |
| 5,752,620 | A | | 5/1998 | Pearson | 221/2 |
| 5,957,372 | A | * | 9/1999 | Dean et al. | 232/43.1 |
| 6,011,999 | A | * | 1/2000 | Holmes | 700/231 |

* cited by examiner

*Primary Examiner*—William Grant
*Assistant Examiner*—Edward F Gain, Jr.
(74) *Attorney, Agent, or Firm*—Michael D. Steffensmeier; Jeffery S. Standley

(57) ABSTRACT

A computerized medication dispensing station that addresses anesthesia medication management and tracking problems is disclosed. Medications, including narcotic and non-narcotic, and supplies for use in anesthesia, are stored in secured, semi-secured, and unsecured containers of a mobile station. A computer housed in the station is used to track the anesthesiology items that have been removed from the station. For each item removed, the time of removal, who removed it, and to whom it was administered is tracked. Items that are not administered to a patient are returned to the pharmacy or wasted (i.e., disposed in accordance with regulations). Each type of event (administration to a patient, return, or waste) is documented so that a health care institution can track usage of items, including narcotic medications, for use in anesthesia.

45 Claims, 16 Drawing Sheets

ANESTHESIA CART PROCESS FLOW

APPARATUS AND METHOD FOR STORING, TRACKING AND DOCUMENTING USAGE OF ANESTHESIOLOGY ITEMS

BACKGROUND OF THE INVENTION

1. Field of the Invention

The present invention relates generally to computerized medication management and dispensing stations. More particularly, the present invention relates to a system, method, and apparatus for controlling the dispensing and inventory of anesthesiology items in a health care institution.

2. Description of Related Art

Medication management in anesthesia presents a challenge for both the pharmacy and the anesthesia departments in health care institutions. Anesthesia requires open, unrestricted access to many medications, including narcotics as well as supplies. Pharmacies, on the other hand, must control access to medications and impose security measures. Organizations such as the Joint Commission on Accreditation of Healthcare Organizations (JCAHO), the Drug Enforcement Agency, and the State Boards of Pharmacy require strict documentation and record keeping of narcotic usage. The JCAHO provides accreditation to member hospitals. In order to earn and keep the JCAHO accreditation, hospitals must adhere to strict access and control policies for medications or risk potential fines and possible shut down of the facility. Fines related to improper management of narcotics in one operating room can be $15,000.00 or more per offense. A study found that 11% of all hospitals reviewed by the JCAHO received a recommendation for improvement based on improper handling of narcotics.

The pharmacy is responsible for medications, particularly from a regulatory perspective, but is able to manage the medications only remotely. As a consequence, a serious responsibility gap exists in medication control from the time the medications are issued to anesthesiologists until the end of the day when remaining medications are returned. Complying with federal regulations is often a tedious task. Anesthesia records are often incomplete with respect to accurate medication usage documentation during and after a procedure. Current methods of anesthesia narcotic medication management are labor intensive for pharmacists and anesthesiologists, often leading to costly errors. Currently, narcotics are generally tracked in one of two fashions.

A first method of tracking narcotics, the satellite pharmacy, is used at some of the larger hospitals. Affluent hospitals often provide a satellite pharmacy that services the special needs of the operating room. The anesthesiologist signs out narcotics from the satellite pharmacy by going to the pharmacy and interacting with a pharmacist. If a pharmacist is not available, one must be paged. The anesthesiologist returns to the satellite pharmacy when a free moment is found to reconcile the unused medications with a pharmacist. Reconciling unused medications requires documenting on the patient record or returning to the pharmacy all medications that were signed out by the anesthesiologist. The pharmacy disposes of contaminated medications (referred to as “waste”) or returns unused medications to stock. This process is time-consuming and cumbersome to both the pharmacy and the anesthesiologist. The task requires a pharmacist to be available at all times that the operating room is in operation. Anesthesiologists must take time away from patient care to reconcile medication usage with the pharmacy. To mitigate these constraints, anesthesia and nursing staff have unsupervised access to the satellite pharmacy during off hours. The burden of narcotic tracking, however, still falls on the pharmacy during these off hour periods and the healthcare facility is exposed to potentially severe regulatory agency repercussions.

Satellite pharmacies are becoming rare due to the expense and overhead of running a specialized pharmacy. As an alternative, many hospitals are using a second method of tracking narcotics called the tackle-box method. The tackle box is a small, locked container that is prepared by the main pharmacy for each anesthesiologist. The anesthesiologist picks up his or her tackle box in the morning from the main pharmacy or from a locked room in the operating room. The location usually depends upon the pharmacy’s delivery capabilities. The tackle box usually contains a usage sheet where the anesthesiologist records the medications that were used, the patients on which the medications were used, and the quantities dispensed. The completed sheet and unused medications are returned at the end of the day to the main pharmacy or to the locked room. The pharmacy must inspect each medication record to insure accuracy and compliance. Any inconsistencies must be addressed with the anesthesiologist. However, the inconsistencies may not be addressed for several days at which point the anesthesiologist may not remember the exact circumstances surrounding the medication discrepancy. The hospital is in direct violation of the regulations until the discrepancy is resolved.

Attempts to automate the medication management process in anesthesia have been made. One product that is currently available is a semi-automated tackle-box system of narcotic medication control made by Secure-1, Inc. of Hamilton, Ohio. A small (about the size of a loaf of bread) metal box with a LCD screen and keypad on its face is used to perform narcotic medication control. The anesthesiologist signs out a box from a storage location. After the box has been removed from the storage location, only the anesthesiologist who signed out the box may open it. Once open, all the medications, including narcotics, are readily accessible. Documentation is provided via the small LCD screen and keypad. Dosages are recorded in the system by time and patient. Although the system provides some electronic information capture, there is still much legwork to be done. First, the anesthesiologist must go someplace to sign out the box. Because of the small size, only narcotics may be stored in the box. The anesthesiologist must gather the required non-narcotics via the old methods described above—either through a satellite pharmacy or a medication cabinet located somewhere outside the operating room. When a case is over, the anesthesiologist must return the box to its storage location where the pharmacy retrieves it to verify and refill contents usage. This product still requires a great deal of manual labor to complete the tracking process. The anesthesiologist is required to carry the box throughout the day. In addition, the anesthesiologist must personally remove the box from a storage location (e.g., outside the operating room) and return it to the same storage area at the end of the day.

The above two scenarios form the basis for medication management in the operating room today. Each requires both time and people to complete the tracking process. Even in a perfect environment, mistakes are made, medications are not documented, documentation is not accurate, or items are diverted without a record. Often, the mistakes are due to uncontrollable events that occur during a procedure. In some cases, an anesthesiologist may require additional medications not anticipated prior to a case. A circulating nurse must then leave the procedure room to retrieve the needed item. This requirement adds unnecessary and costly delays to the procedure. Whatever the case, the result is inaccurate medication usage documentation.

In addition to control of narcotic medications, management of non-narcotic medications and supplies is often inefficient and leads to costly errors. To manage non-narcotic medications and supplies, anesthesiologists typically use a system separate from narcotic management. Anesthesiologists employ a non-secured, non-automated mobile drawer cart, often a Blue Bell Cart or a Sears Craftsman tool chest, to store these non-secured items. Narcotics are not stored in these carts because the cart is not locked. Therefore, a separate system for narcotic management is still required. Typically, every operating room has its own cart so that non-narcotics and supplies are readily available for use by any anesthesiologist using the room.

This non-automated, non-secured practice often results in errors in patient billing and stock-outs (i.e., depletion of the entire inventory of a particular item). Stock-out risks cause anesthesiologists to overstock all medications and supplies in the carts, thus incurring a much greater storage cost than necessary. If an operating room has anesthesia technicians on staff, then the responsibility of refilling the carts falls to them. However, due to cost cutting measures, few facilities have the luxury of anesthesia technicians. The responsibility of restocking the carts then falls to operating room technicians for supplies and the pharmacy or nursing for non-narcotics, further adding to their non-patient care oriented responsibilities.

Another factor that makes tracking difficult is the manner in which an anesthesiologist works. An anesthesiologist's workflow is very different from that of a nurse working on a general care floor of the hospital. Typically, an anesthesiologist collects all needed medications before a case begins. The medications are prepared by a pharmacy or satellite pharmacy and provided in a tackle box. Alternatively, the doctor may retrieve narcotics from a locked cabinet. In either case, the anesthesiologist must take a significant amount of time to prepare for a case. In many cases, the anesthesiologist requires additional medications or additional quantities of a medication that were not anticipated before the case began. To address these problems, the anesthesiologist sends the circulating nurse out of the procedure room to gather the required medication. This time-consuming process delays the procedure.

Another factor that makes the tracking problem complex is that some medications may not be used during a procedure. Unlike in a general care unit, when medications are signed out by an anesthesiologist, they are not necessarily going to be administered. An anesthesiologist works within a given set of medications and uses those that he or she deems necessary for the given conditions of the patient. The medications that are not used during the procedure must be returned to pharmacy or disposed of (i.e., "wasting").

Another complicating factor in the tracking process is that the practice of anesthesia uses a small number of medications. Most of them are non-controlled. The types of medications remain relatively constant for each type of case. Pharmacies typically provide anesthesia drug packs or kits for certain cases such as cardiac, neuro, critical care, pediatric, and general to address these medication and supply problems. Anesthesiologists are accustomed to working with such kits and expect such kits to be readily available.

SUMMARY OF THE INVENTION

The present invention—the Anesthesia Cart—is a computerized medication and supply dispensing station that addresses anesthesia medication management and tracking problems. The Anesthesia Cart is a mobile cart that securely stores all narcotic medications, non-narcotic medications, and supplies (collectively, anesthesiology items or items) for anesthesiologists in one complete system. Items may be stored in secured drawers that remain locked at all times and require the input of specific information each time they are accessed (e.g., for storing narcotics), semi-secured drawers that remain locked until a user logs in to the system (e.g., for certain types of non-narcotics and supplies), and unsecured drawers that are always unlocked (e.g., for non-narcotics and supplies). The unit may be placed in each operating room of a healthcare facility and replaces current anesthesia storage cabinets. It also adds several valuable features such as tracking features. The system automates patient usage records, documents waste, manages inventory levels, and tracks the anesthesiology items that have been removed from the station, the time of removal, who removed them, and to whom they were administered. The tracking features include information regarding practitioner, patient, procedure, and medication or supply item. An automated account of medication usage may be created that reports on effectiveness during a case as well as comparisons between practices of the different doctors on staff. The reports may be based on procedure type, practitioner, patient, or any other piece of data captured by the system.

Many of the problems with current tracking methods are addressed. Operation of the present invention is extremely intuitive and is conducive to the anesthesiologist's workflow. Medication or supply usage is recorded at the time the anesthesiologist confirms an administration of an item rather than at the time of removal from the station. The invention stores kits containing multiple items, individual line items, or a mixture of both so that the anesthesiologist may administer the medications or use the supplies that are appropriate for the given conditions of the patient. Additional functions for set up, loading, refilling, unloading, and performing inventory operations are also supported.

The present invention is a cabinet supported by wheels, casters, or rollers for mobility. The cabinet is equipped with a control unit comprising a computer, a monitor (preferably, an illuminated touchscreen), and a keyboard to provide access to the medications and supplies that are stored in the drawers of the cabinet. An anesthesiologist interacts with the control unit via the touchscreen monitor and/or keyboard to enter and review patient and case information, to access the medications and supplies stored in the cabinet drawers, and to reconcile item usage (e.g., record the assignment, return, waste, or transfer of medications or supplies).

To use the present invention, an anesthesiologist logs into the station's computer, removes one or more anesthesiology items, and after administration of the anesthesiology items, documents item usage. Documenting item usage includes assigning items to a case, returning items, wasting items, and transferring items. Alternatively, the anesthesiologist may log into the stations' computer and select a case so that anesthesiology items are assigned to the selected case as they are removed. The control unit of the station is adapted to capture case information as well as information regarding the anesthesiologist(s) associated with the case. Case information includes information about the anesthesiology items used for a specific procedure associated with a patient including the medications that will be or have been administered to the patient. Case information may be entered either before or after removal of items from the cart. It is important to note, therefore, that the anesthesiologist is not required to select a case prior to removing anesthesiology items from the cart. This flexibility in determining when anesthesiology items may be documented (i.e., after items have been removed or as items are being removed) is unique to the present invention.

When the anesthesiologist is ready to administer the medications or supplies to the patient, he or she selects an item to be removed from a list of medications or supplies appearing on the screen. If the item is in a secured drawer (e.g., a narcotic), it is made available for removal. Each removal of an item from the cabinet, whether from a secured or unsecured drawer, is associated with the anesthesiologist who has logged in to the station's computer. If the anesthesiologist has selected a case, the items are also assigned to the selected case as they are removed. For items removed from secured drawers, the system prompts for information based on the medications removed, acting as a reminder to the anesthesiologist to insure proper documentation. This documentation process may be done for any previously removed item at any time during the procedure or at a later time. Following completion of the documentation process, the captured data provides the pharmacy with an electronic record of each medication's usage during a case. If an anesthesiologist fails to document usage, the pharmacy may then check with the anesthesiologist to determine why the anesthesiology item use has not been reconciled.

The present invention provides significant advantages over the prior art. First, the station is mobile and may hold all medications required for a procedure in the room. An anesthesiologist may locate medications and supplies quickly and easily as they are needed. Using the present invention, the anesthesiologist no longer needs to stand in line at a satellite pharmacy or carry around keys to a narcotic room or use simultaneous processes to obtain needed supplies. Second, the documentation process is facilitated with the real-time, interactive system of the station. The necessary information is collected and processed as anesthesiologists assign items to cases. Third, the reporting capabilities provide the pharmacy and administration with accurate drug practice information. Health care institutions that use the present invention feel secure that required items will be immediately available and that medication and supply usage documentation will be completed properly. The present invention saves hours of unproductive legwork and manual documentation that are required by prior art systems.

BRIEF DESCRIPTION OF THE DRAWING(S)

DETAILED DESCRIPTION OF THE PREFERRED EMBODIMENT(S)

Figure 1:
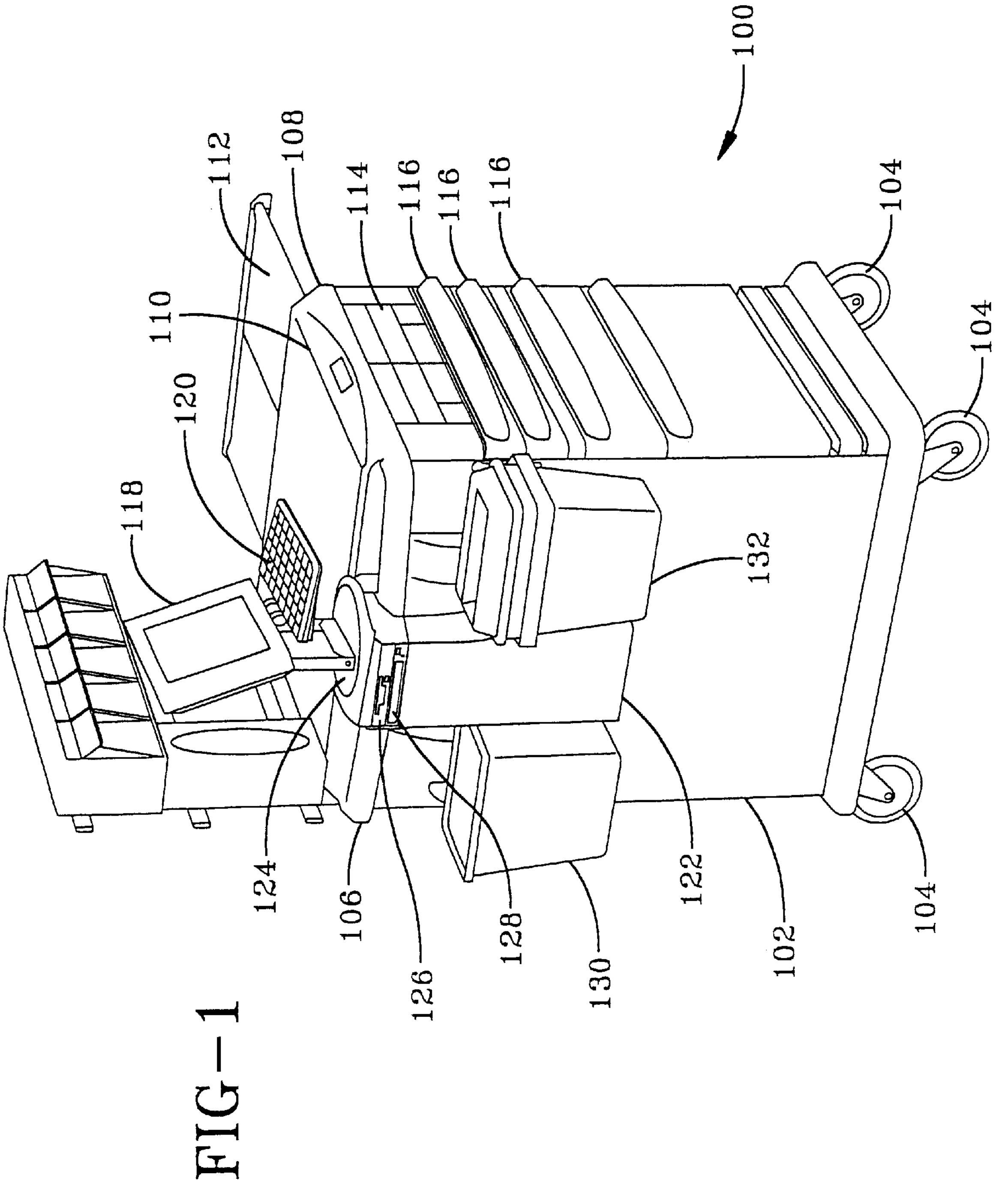
FIG. 1 is an example of an anesthesia cart in accordance with the present invention.

Referring to FIG. 1, the anesthesia cart 100 of the present invention, preferably, is a compact cabinet 102 supported by wheels 104 so that it may be moved easily throughout an operating room. Alternatively, casters or rollers may be used to increase maneuverability of the cart. A handle 106 molded with the top surface facilitates movement of the cart in all directions. A bumper 108 around the bottom periphery of the unitop surface protects the cart from being damaged in the event of a collision. Finally, a flat work surface area 110 and pull-out shelf 112 provides ample space for performing a variety of tasks in addition to dispensing and controlling anesthesiology items.

As used herein, "anesthesiology items" refers to all narcotic medications, non-narcotic medications, and supplies such as Fentanyl, Pentothal Sodium, Demerol, Prostigmin, Robinul, syringes, needles, catheters, masks, etc. Anesthesiology items to be dispensed are stored in drawers or receptacles 114, 116 of a variety of shapes and sizes. Drawers may be secured 114, semi-secured 116, or unsecured depending on their contents. Each drawer may have associated with it a control mechanism comprised of hardware (e.g., solenoids and additional circuitry for accepting authorization signals from software components) and/or software components (e.g., user and password requirements for communicating authorization signals to drawer hardware). Secured drawers remain locked until a user requests an item (usually a narcotic medication) and follows a procedure for accessing the contents of a drawer. Preferably, only the drawer containing the requested item is temporarily unlocked for access. Upon closing, the drawer is resecured (i.e., locked) so that the user is required to input information to open the drawer and access its contents a second time. For example, in one embodiment of the present invention, secured drawers may be partitioned into consecutively spaced compartments and controlled by a solenoid and other hardware to allow graduated access to the compartments. Previous activity of the drawer is tracked so that when later accessed, the drawer may pop open or may be allowed to be pulled open to a length that exposes the contents of a compartment either not emptied or uncovered in previous openings. Drawers in accordance with the present invention may be fashioned as described in U.S. Pat. No. 5,716,114, entitled Jerk-Resistant Drawer Operating System, issued to the applicant of the present invention on Feb. 10, 1998 which is hereby incorporated by reference herein.

Another type of drawer that may be employed in the anesthesia cart is the semi-secured drawer. A semi-secured drawer may be coupled with a control mechanism that allows the entire drawer to be opened upon input of required information (e.g., logging on to a station computer). The drawer remains unlocked and may be opened and closed repeatedly until an event causing the drawer to be secured occurs (e.g., logging off of a station computer).

In an alternative embodiment of the present invention, the anesthesia cart may be equipped with latched receptacles in which each receptacle has a computer controlled latch and associated hardware that provides information about the contents of the receptacle to a computer. The latch may be opened and the contents of the receptacle accessed upon entry of required information at which time an authorization signal is received at the latch. Latched receptacles may be configured to required entry of required information upon each access or to be unlatched upon the occurrence of a first event (e.g., login to a station computer) and latched upon the occurrence of a second event (e.g., logout of a station computer). In this respect, the latched receptacles may be configured to operate in a fashion similar to that of the secured and semisecured drawers. Latched receptacles in accordance with the present invention may be fashioned as described in U.S. Pat. No. 6,116,461, entitled System and Apparatus for the Dispensing of Drugs, assigned to the applicant of the present invention and filed on May 29, 1998, which is hereby incorporated by reference herein.

In a preferred embodiment of the present invention, narcotic medications are stored in secured drawers 116 such that the anesthesiologist is required to follow specific procedures to reach their contents. Preferably, the anesthesiologist is required to request a specific amount of a secured medication before the drawer containing it is opened. The anesthesiologist accesses the specific amount of the secured medication that was requested. Non-narcotic medications and supplies may be stored in semi-secured drawers 116 so that the anesthesiologist may access them after login. Preferably, the semi-secured drawers unlatch and latch simultaneously upon user login and log-out, respectively, so their contents are freely available during a procedure. Finally, non-narcotic medications and supplies may be stored in unsecured drawers so they are accessible to anyone at any time. It is understood that the anesthesia cart may be configured with any combination and size of secured, semi-secured, and unsecured drawers and/or latched receptacles depending on the needs of the users. In other words, the anesthesia cart of the present invention may be configured with a plurality containers (e.g., drawers and/or latched receptacles) any of which may be secured, semi-secured, or unsecured. In addition, it is understood that anesthesiology items may be stored in any type of container (e.g., drawer and/or receptacle) depending on the needs of the users.

An access control unit comprising a computer, monitor 118, and keyboard 120 (or equivalent type of data entry device and/or data processor) equipped with appropriate user interface, communications, etc. software provides access to the anesthesiology items that are stored in the containers of the cart. A container control unit comprising additional hardware (e.g., switches, sensors, solenoids, pulleys, stops, cables, motors, drums, etc.), circuitry, and logic provides communication between the software of the access control unit and container hardware including any latch that may be used for securing the container. Each container may have its own control unit. Software and hardware for the control of containers (e.g., drawers and/or latched receptacles) in accordance with the present invention may be fashioned as described in U.S. Pat. No. 5,445,294, entitled Method for Automatic Dispensing of Articles Stored in a Cabinet, assigned to the applicant of the present invention and issued on Aug. 29, 1995. Consequently, the containers of the present invention may be controlled by a computer or its equivalent (e.g., data entry device and/or data processor).

Each drawer may be further subdivided into two or more compartments each of which may hold the various medications or supplies to be administered to patients. The computer and other components that an anesthesiologist need not access while using the cart may be housed inside the cart. Preferably, housed components are accessible through a cover 122 on the side of the cart. A rotating extension monitor stand 124 makes it easy to view the monitor 118 from a variety of angles. Preferably, the monitor 118 is a color touchscreen for easy data entry. Lists of patients, anesthesiology items, etc. may be presented and selected by touching the desired list item. The attached keyboard 120 may also be used for data entry. Other types of data entry devices and/or data processors may be used as well.

Preferably, the cart is equipped with a floppy disk drive 126 for loading information onto the station computer and performing maintenance functions, etc. Preferably, the floppy disk drive is accessible only to authorized personnel such as maintenance technicians. The cart may also be equipped with a CD-ROM 128 that may be used to access reference manuals and other information that may assist the anesthesiologist in performing his or her duties. Preferably, the cart is equipped with a network card and other devices that support networked communications such as those that may be required to interact with the pharmacy computer systems and other departmental computers. Although equipped with a network card, the cart computer need not be connected to a computer network to operate. The network card allows the cart computer to be connected to another computer system to facilitate the exchange of information between the cart computer and another computer system (e.g., for inventory control, for maintenance, for transferring status information). Finally, the cart may be equipped with accessory holders 128, 130 that allow the anesthesiologist to transport items that may be required such as gloves, tape dispensers, container for waste, clock with timer, file folders, vial holders and an IV pole.

Figure 2:
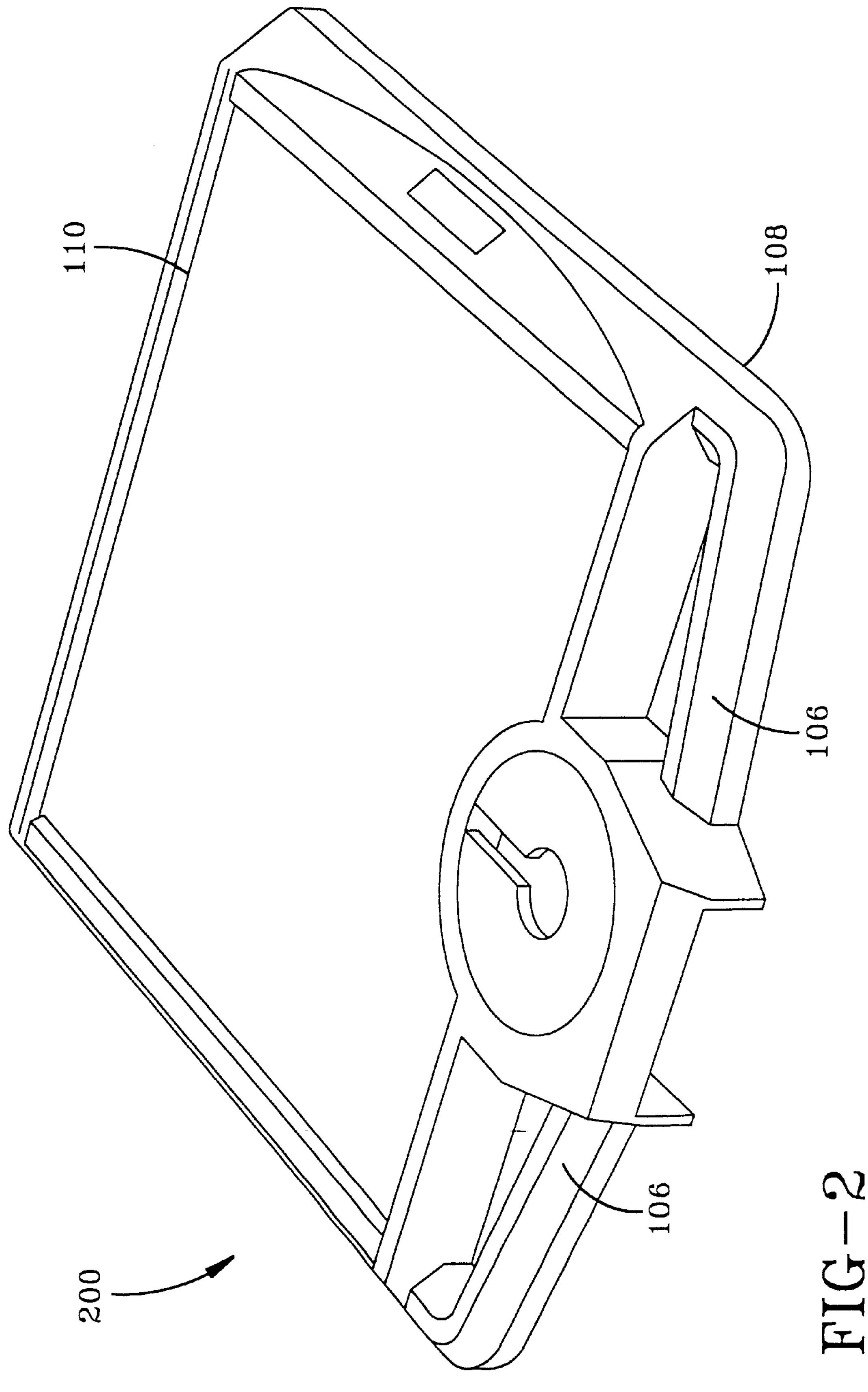
FIG. 2 is an example of a molded handle for an anesthesia cart in accordance with the present invention.

Referring to FIG. 2, a unitop 200 for a preferred embodiment of the anesthesia cart is shown. As explained above, the handles 106 and 110 are a one piece unit. A bumper 108 around the periphery provides protection of the station and its contents.

Figure 3:
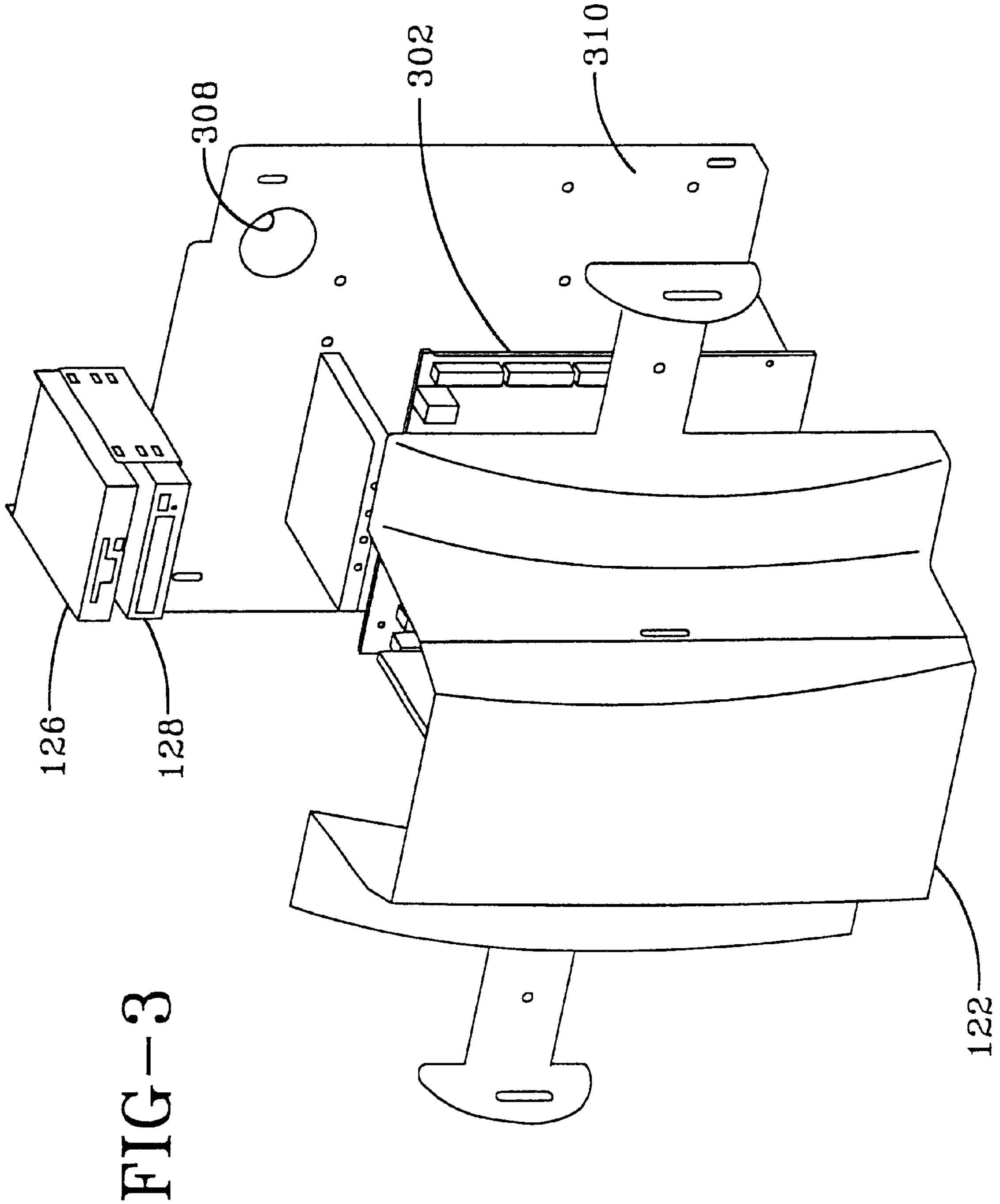
FIG. 3 is an example of a cabinet cover and computer components for an anesthesia cart in accordance with the present invention.

Referring to FIG. 3, a cabinet cover 122 and computer components for an anesthesia cart in accordance with the present invention is shown. The cover 122 protects the computer housed in the station as well as provides easy access to the various components that comprise the computer. First, a mother board 302 may be mounted inside the station. In addition, the station maybe equipped with an electronic display sled 310 and a wire harness routing hold 308. Other computer components include a floppy disk drive 126 and a CD-ROM drive 128.

Figure 4B:
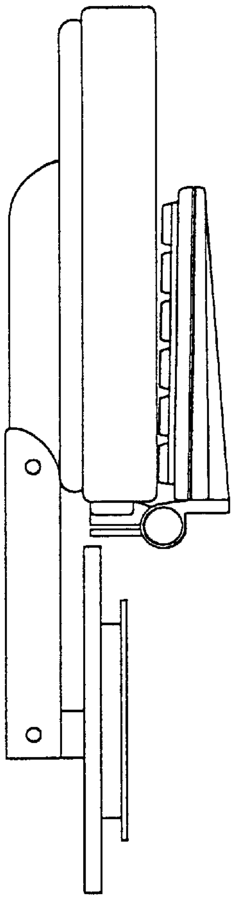
FIGS. 4A and 4B are examples of a monitor and keyboard for a computer housed in an anesthesia cart in accordance with the present invention.
Figure 4A:
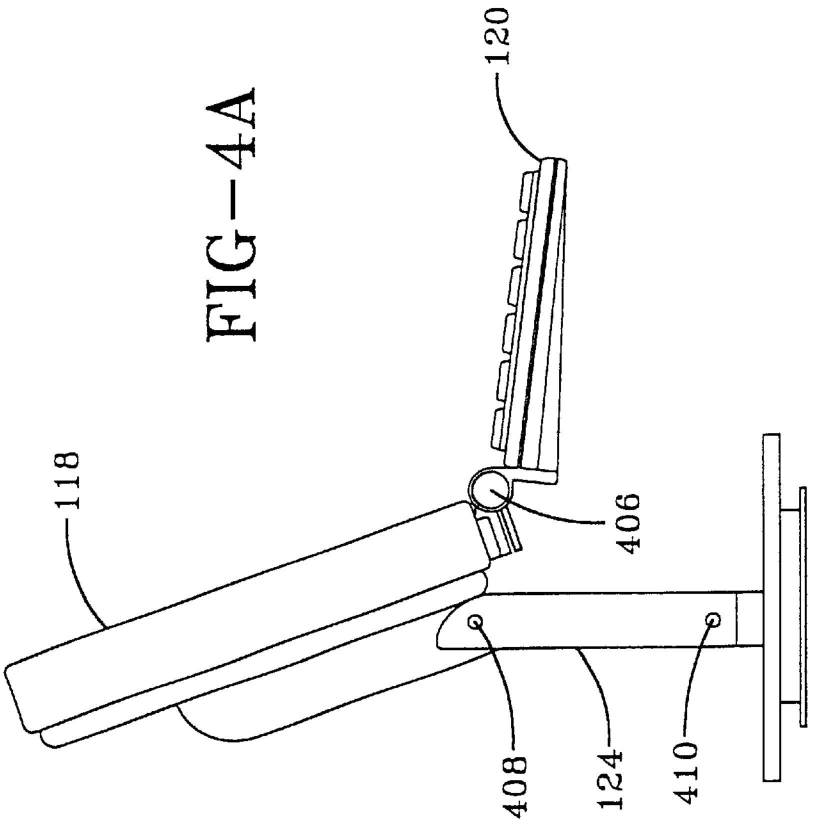

Referring to FIG. 4A, a monitor 118 and keyboard 120 (or equivalent data entry video terminal) for a computer housed in an anesthesia cart in accordance with the present invention is shown. As explained above, the monitor 118 and keyboard 120 are preferably mounted on a rotating stand 124 for easy access. The rotating stand 124 preferably, is equipped with several pivot points 408 and 410 for easy storage of the monitor and keyboard and transportation of the unit. The monitor 118 and keyboard 120 may also be connected by a pivot point 406. The incorporation of pivot points 406, 408, 410 allow the monitor 118 and keyboard 120 to be closed in a configuration similar to a laptop computer and folded on to the work surface as shown in FIG. 4B. In the closed configuration, the monitor and keyboard may be protected during transportation of the station. Other types of data entry video terminals may be used as well.

A set up function in the software provided with the cart computer allows a user with appropriate privileges to perform general administrative tasks as well as to set station and container configurations and create kits. Load, refill, unload, and inventory functions that are supported in the software provide assistance in stocking the cart with appropriate anesthesiology items. Medications to be administered from the containers of the cart may be stored as individual items, logical kits, or physical kits. A logical kit (or personal kit) is a logical grouping of medications and/or supplies and may be personalized for each anesthesiologist. The logical kit may contain logical groupings of anesthesiology items for a specific procedure (e.g., neuro, cardiac, etc.) The logical or personal kit provides a shorthand method for selecting multiple items in specific quantities. Each item in a logical or personal kit is an individual inventory item stored in its own location (e.g., its own compartment in the cart). A physical kit, on the other hand, contains multiple anesthesiology items of the same type. For physical kits, individual components may be pre-packaged in the pharmacy and stored in a single compartment in the cart. In this case, the items are removed from a single compartment. When either type of kit is removed from the cart, the kit is expanded into its component items which are then associated with the anesthesiologist and may be managed individually. Transaction documentation may be completed for each individual item contained in the kit.

Preferably, the cart system of the present invention supports two units of measure—vending units and administration units. Vending units relate to the manner in which medications are packaged (e.g., one vial containing 10 ml of a medication). Functions related to cart inventory (e.g., loading, unloading, and refilling) use vending units. Administration units relate to the manner in which items are used on a patient regardless of how they may have been packaged (e.g., 10 ml of Amidate may be administered, not one vial). Conversion between vending and administration units is accomplished through the integer ratio of administration units to vend units for each item.

Figure 5:
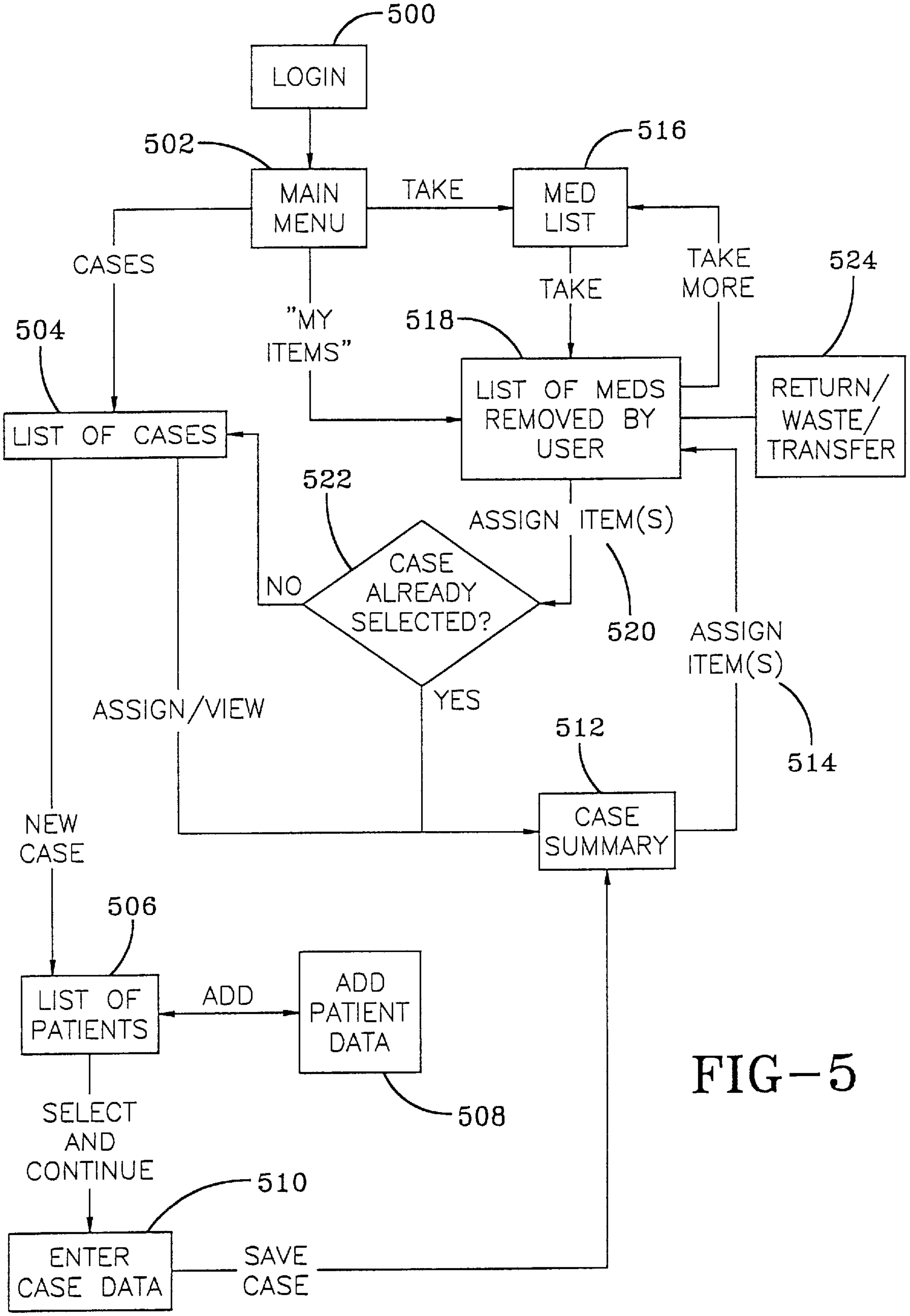
FIG. 5 is a flowchart of the process for interacting with the anesthesia cart of the present invention.
Figure 6:
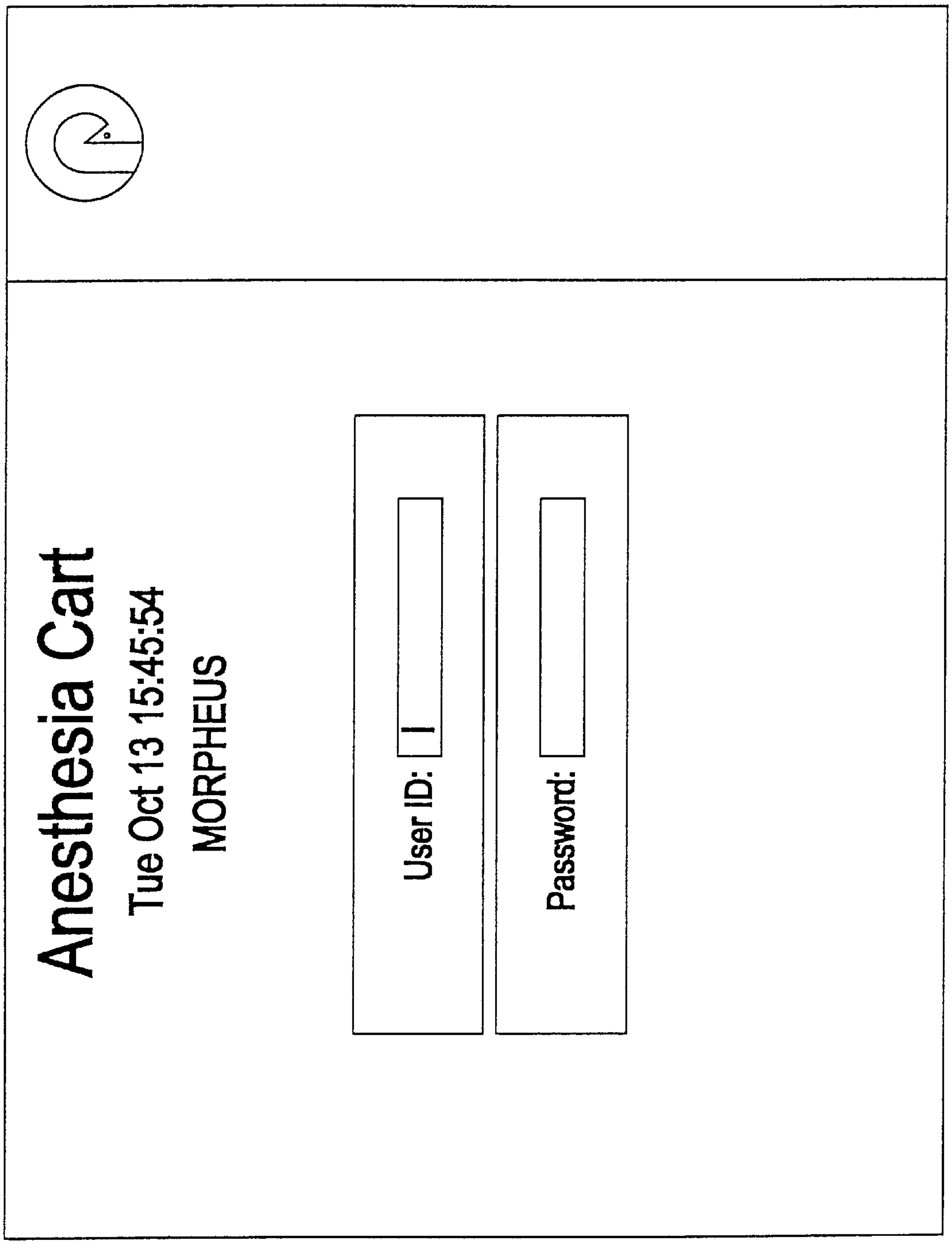
FIG. 6 is an example of a login screen for a preferred embodiment of the present invention.
Figure 7:
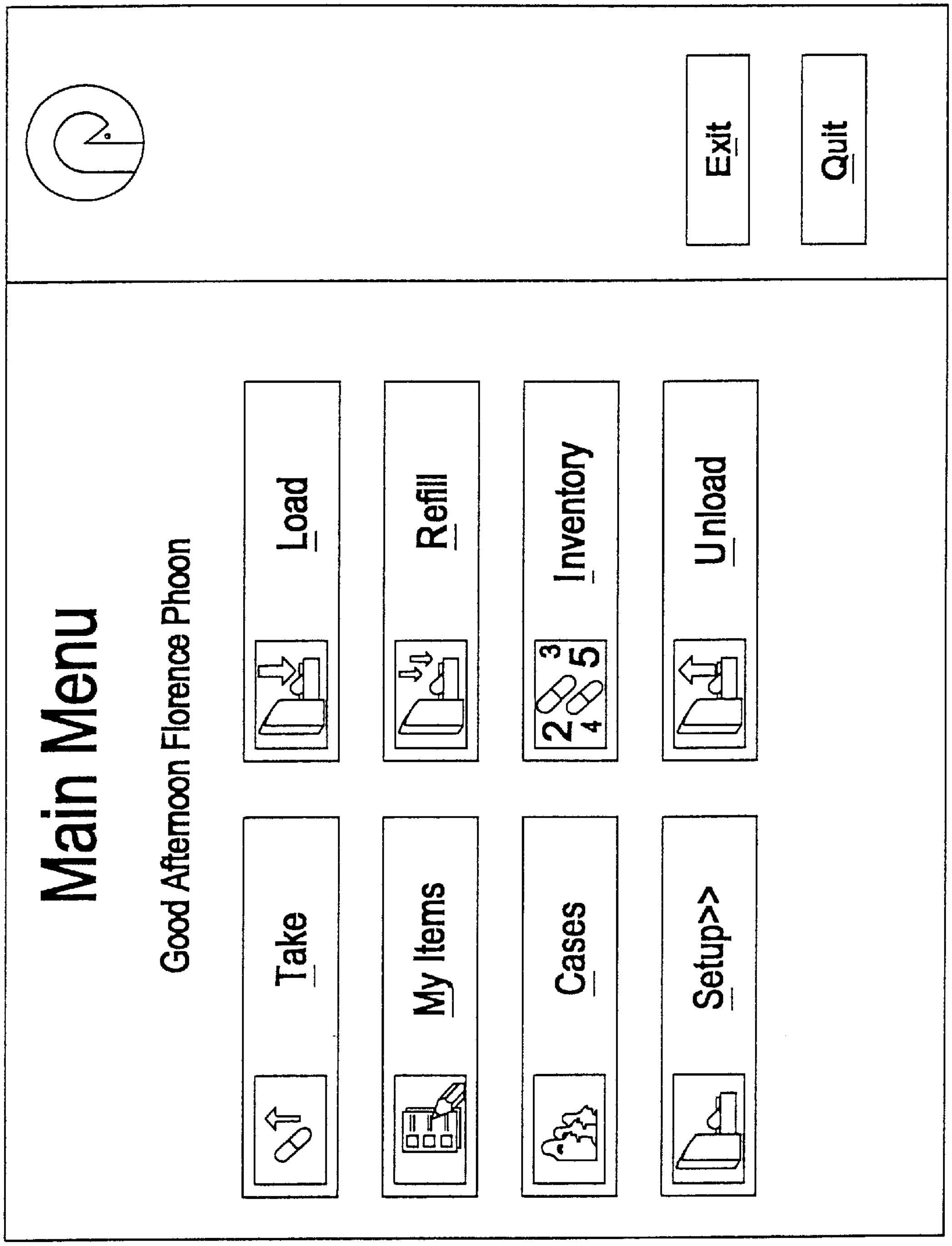
FIG. 7 is an example of a main menu screen for a preferred embodiment of the present invention.

Referring to FIG. 5, the process for use of the anesthesia cart by an anesthesiologist is shown. First, in step 500, the anesthesiologist logs into the station. An example of a login screen for a preferred embodiment of the present invention is shown in FIG. 6. The login procedure may be based on a standard identifier and password scheme. Alternatively or in conjunction with the primary login procedure, the login procedure may be based on biometrics such as eyeprint, fingerprint, etc. Upon login, the anesthesiologist is presented with a main menu presenting options for proceeding. An example of a main menu for a preferred embodiment of the present invention is shown in FIG. 7. As shown in FIG. 7, the three options of greatest interest to the anesthesiologist are the "Take," "My Items," and "Cases." The "Setup," "Load," "Refill," "Inventory," and "Unload" functions may be used by personnel responsible for stocking the cart and performing other administrative functions necessary for maintenance of the cart. As shown in step 502 of the flowchart of FIG. 5, the primary functional options of the main menu are presented to the anesthesiologist (i.e., "Cases," "My Items," and "Take"). By selecting "Cases," the anesthesiologist may perform actions related to definition of patient cases (step 504). A case is a specific procedure (e.g., cardiac, neuro, orthopedic, etc.) that is associated with a specific patient. By selecting "My Items," the anesthesiologist may perform actions related to documentation of items removed from the cart (step 518). By selecting "Take," the anesthesiologist may perform actions related to removal of items from the cart (step 516). Once the doctor signs in (step 500), a permanent anchor is set until he or she logs out. Preferably, the system does not automatically log out the anesthesiologist. Instead, the anesthesiologist may choose when to logoff the system. This procedure prevents untimely time-outs that may serve only to frustrate the anesthesiologist. Preferably, at this point, semi-secured containers may be unlatched so that their contents may be accessed. The anesthesiologist may lock the cart to prevent unauthorized access if he or she needs to leave the cart's locale for any reason. Locking a cart prevents access to the cart by anyone except the authorized anesthesiologist(s) or a system administrator. If an administrator logs on, any outstanding items are recorded as not accounted for by the doctor who removed them.

Figure 8:
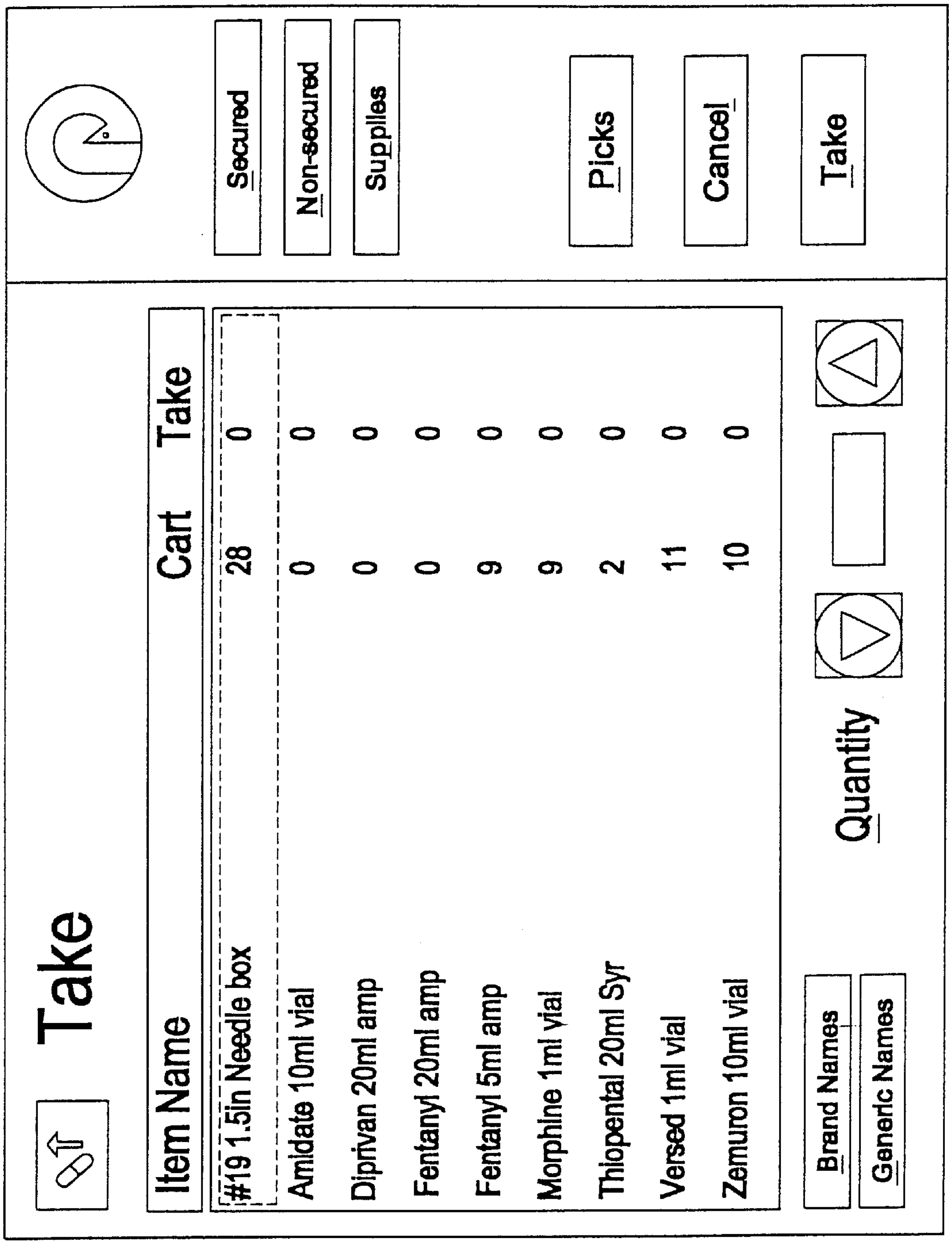
FIG. 8 is an example of a item list screen for a preferred embodiment of the present invention.

In step 516, the anesthesiologist may begin the process of removing items from the cart (Take). To take an item, the anesthesiologist indicates that he or she has removed an item from the cart. The removed item is automatically associated with the identifier provided by the anesthesiologist during the login procedure. The removed item is not, however, assigned to a case unless the anesthesiologist has already selected a case. In this case, the item is "take case specific" and is automatically assigned to the selected case. An example of a take list for a preferred embodiment of the present invention is shown in FIG. 8. As shown in FIG. 8, the anesthesiologist is presented with the options of selecting secured items, non-secured items, or supplies. Preferably, items are removed in vend units which may or may not correspond to administration units. For example, one 10 ml of vial of Amidate may be removed resulting in 10 ml of medication that may be administered individually. Therefore, the removal of one vial may be shown as 10 ml. A window showing selected items and quantities of items may be presented to the anesthesiologist (e.g., by selecting a "Picks" button). Preferably, the quantity of an item may be changed by repeated touches or by using a numeric input field and increment/decrement buttons. If a kit is selected, the component line items that comprise the kit may be viewed by selecting, for example, a "Contents" button.

Figure 9:
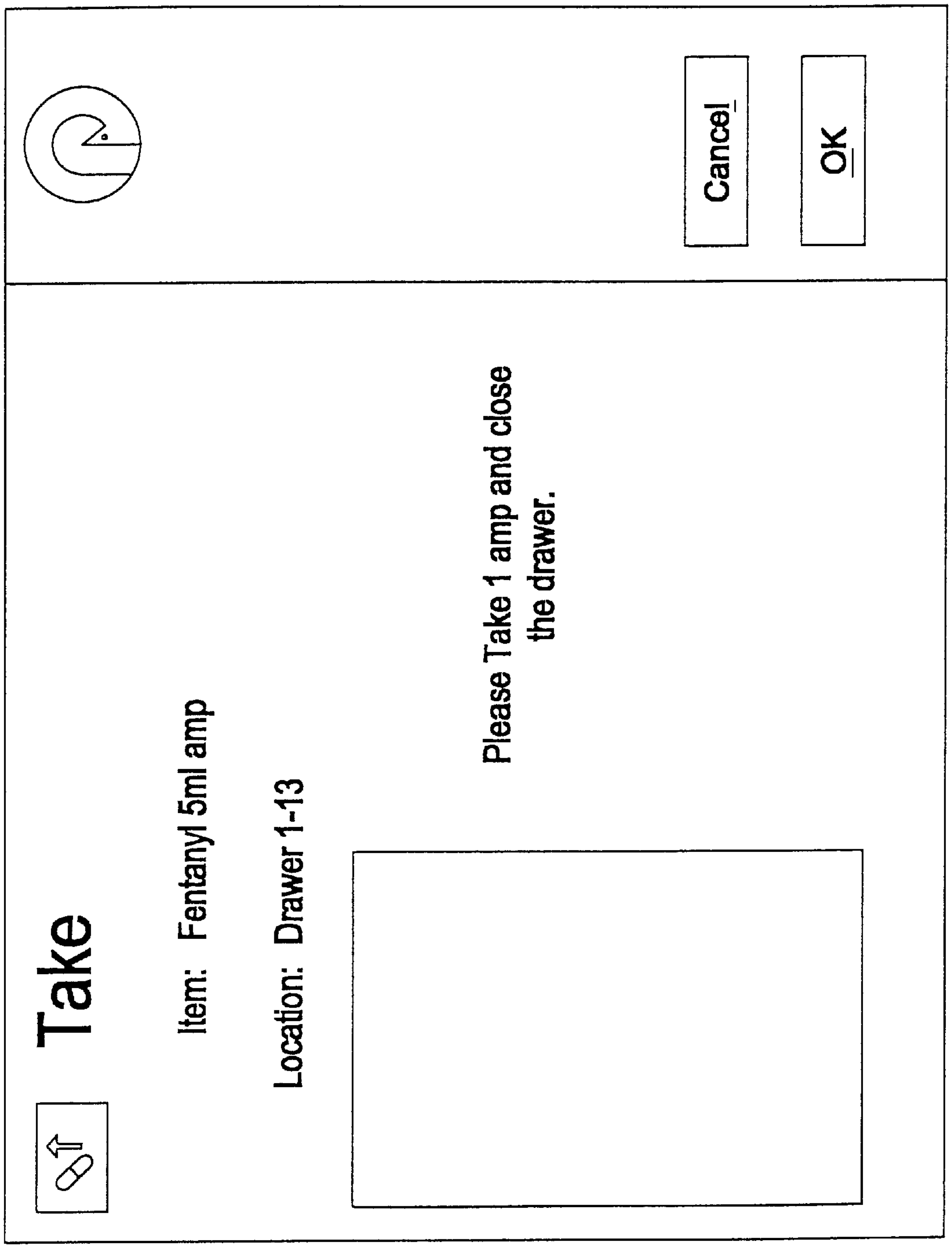
FIG. 9 is an example of a take screen for a preferred embodiment of the present invention.

As explained above, the contents of semi-secured containers may be accessed following the login procedure. The anesthesiologist may then open the semi-secured containers and remove items as needed. Preferably, the anesthesiologist is not required to request items from semi-secured containers using the software interface. If a kit is selected, preferably, the anesthesiologist may view the component items by selecting a Contents button. When convenient, the anesthesiologist may inform the system of which items have been removed from semi-secured containers by selecting them from a list of semi-secured items that may include non-narcotic medications or supplies. For secured medications (i.e., narcotics), the anesthesiologist, preferably, is required to request a specific amount of medication before the container containing it opens. An example of a screen for requesting a secured medication for a preferred embodiment of the present invention is shown in FIG. 9. Upon selection of a Take button, access to the secured container may be permitted. Referring again to FIG. 5, as secured items are removed from the cart, they are added to a table of removed items to be reconciled or documented as shown in step 518.

The removed items are associated with the identifier provided by the anesthesiologist at login. The removal of semi-secured and unsecured items is recorded (i.e., associated with the identifier) without further interaction from the anesthesiologist. Additional item removal may be done at any time during a procedure.

Following completion of the item removal, the anesthesiologist is presented with one of two screens. If the take operation was initiated from the main menu or the My Items option, the anesthesiologist is presented with the list of medications that have been removed (step 518). If the take operation was initiated from a case summary, the anesthesiologist returns to the case summary page (step 512). The anesthesiologist therefore, may begin the process of removing items using one of two methods and may choose the one he or she finds most convenient.

Figure 10:
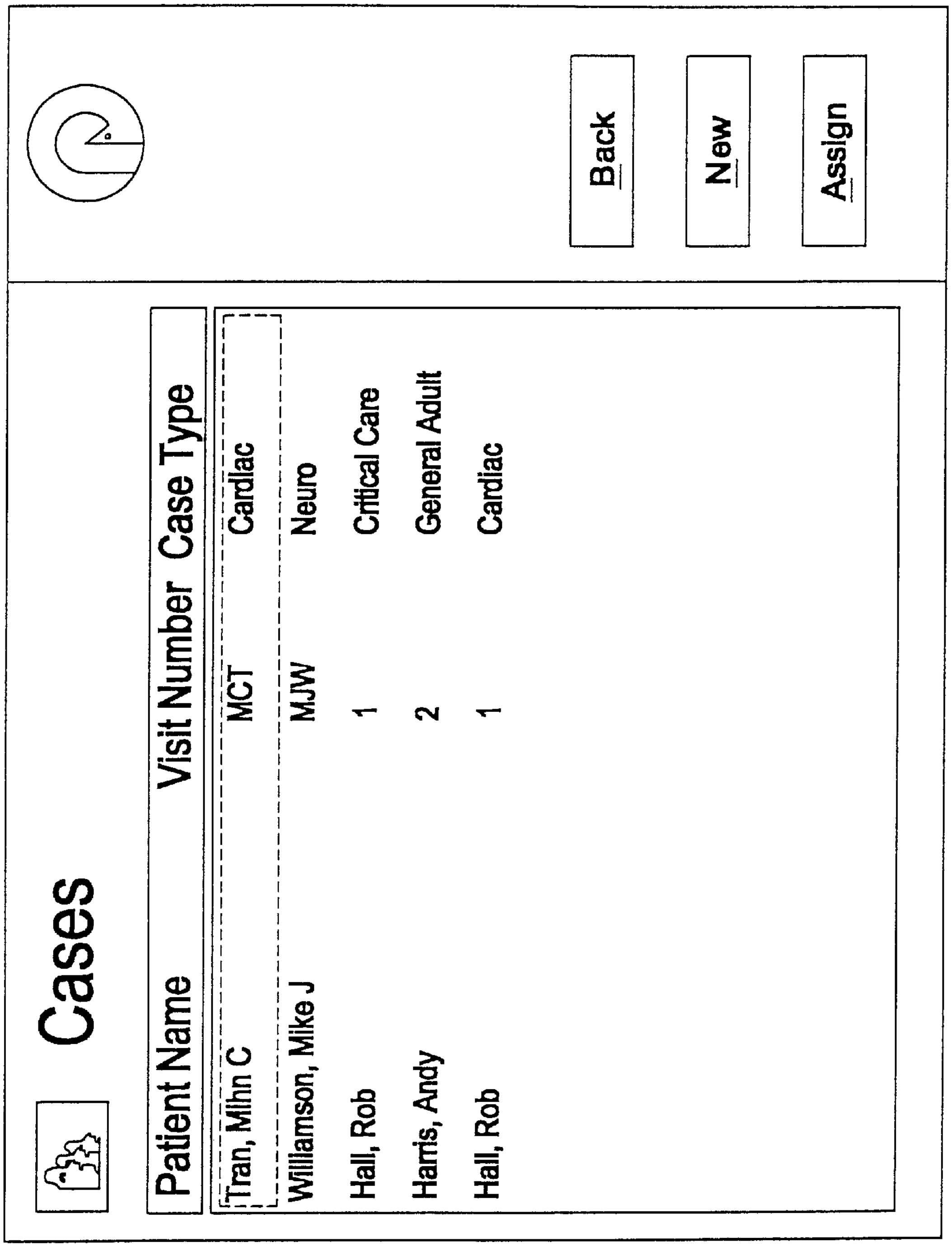
FIG. 10 is an example of a cases screen for a preferred embodiment of the present invention.

Step 504 is the entry point for case management functions. At step 504, a list of all cases that have been entered into the system is presented to the anesthesiologist. An example of a case list for a preferred embodiment of the present invention is shown in FIG. 10. Referring again to FIG. 5, at step 504, the anesthesiologist has the option of performing tasks related to an existing case by selecting a case from the case list (step 512) or entering a new case (step 506). To enter a new case (step 506), the anesthesiologist preferably selects a patient name from a list of admitted patients. To further facilitate the procedure of selecting a patient name, an interface to an operating room scheduling system may be provided so that the anesthesiologist may see which patients are scheduled for surgery. Alternatively, the anesthesiologist may enter a patient name or other patient identifier to locate a patient. If a patient cannot be found in the system, the anesthesiologist may enter new patient data. Once a patient has been selected, the anesthesiologist may enter additional patient data including a case type, a case number, a CPT code, general notes and other data relevant to the patient's condition, etc. (Step 508). In the next step related to a new case (step 510), the anesthesiologist enters case data for the selected patient. The case data is then saved and may be available in a case summary.

Figure 11:
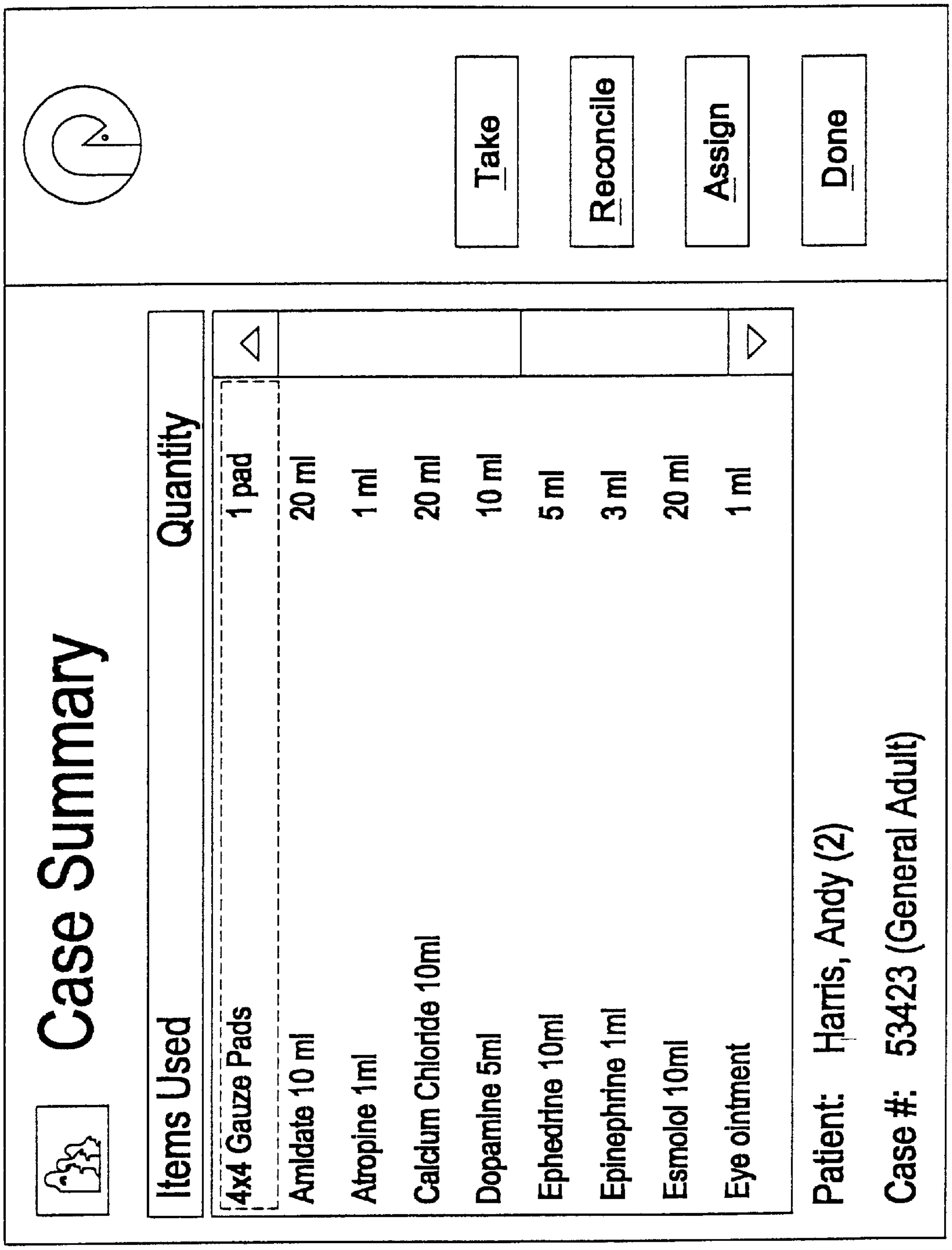
FIG. 11 is an example of a case summary screen for a preferred embodiment of the present invention.

In the next step (step 512), the anesthesiologist may review a summary of the case before assigning items to the case. An example of a case summary screen for a preferred embodiment of the present invention is shown in FIG. 11. Referring again to FIG. 5, if case information had been entered previously, the anesthesiologist may select a case (step 504) and then, review a summary for the selected case (step 512). Otherwise, the anesthesiologist may proceed to the case summary function (step 512) after entering the case data (step 510). The case summary displays a list of all items that have been assigned to a specific case. Items preferably, are displayed in quantities of administration units (e.g., 10 ml rather than 1 vial).

In step 514, the anesthesiologist assigns items (i.e., medications or supplies or kits) to the selected case. In the assigning items, individual items that have been taken from the cart are associated with the selected case. Individual items and dosages may be selected from predefined lists or they may be entered through a dialog box or other screen appearing on the monitor. The anesthesiologist may change the quantity of a medication administered to a patient. For example, if the case indicated that 10 ml of a medication would be administered, but only 5 ml was actually administered, the anesthesiologist may indicate that a smaller quantity was actually given. The balance not recorded as administered may be wasted, returned, or may remain in the possession of the anesthesiologist for administration to a different patient. Alternatively, the anesthesiologist may assign a kit to the case. As items and/or kits are assigned, a medication list is compiled to indicate which items or kits are in the cart. Preferably, in all operations in which lists of medications or supplies are displayed, the anesthesiologist has the option of reviewing items in brand name descriptions or generic name descriptions. Preferably, brand/generic name display modes may be controlled by a toggle button at the bottom of a list.

Figure 12:
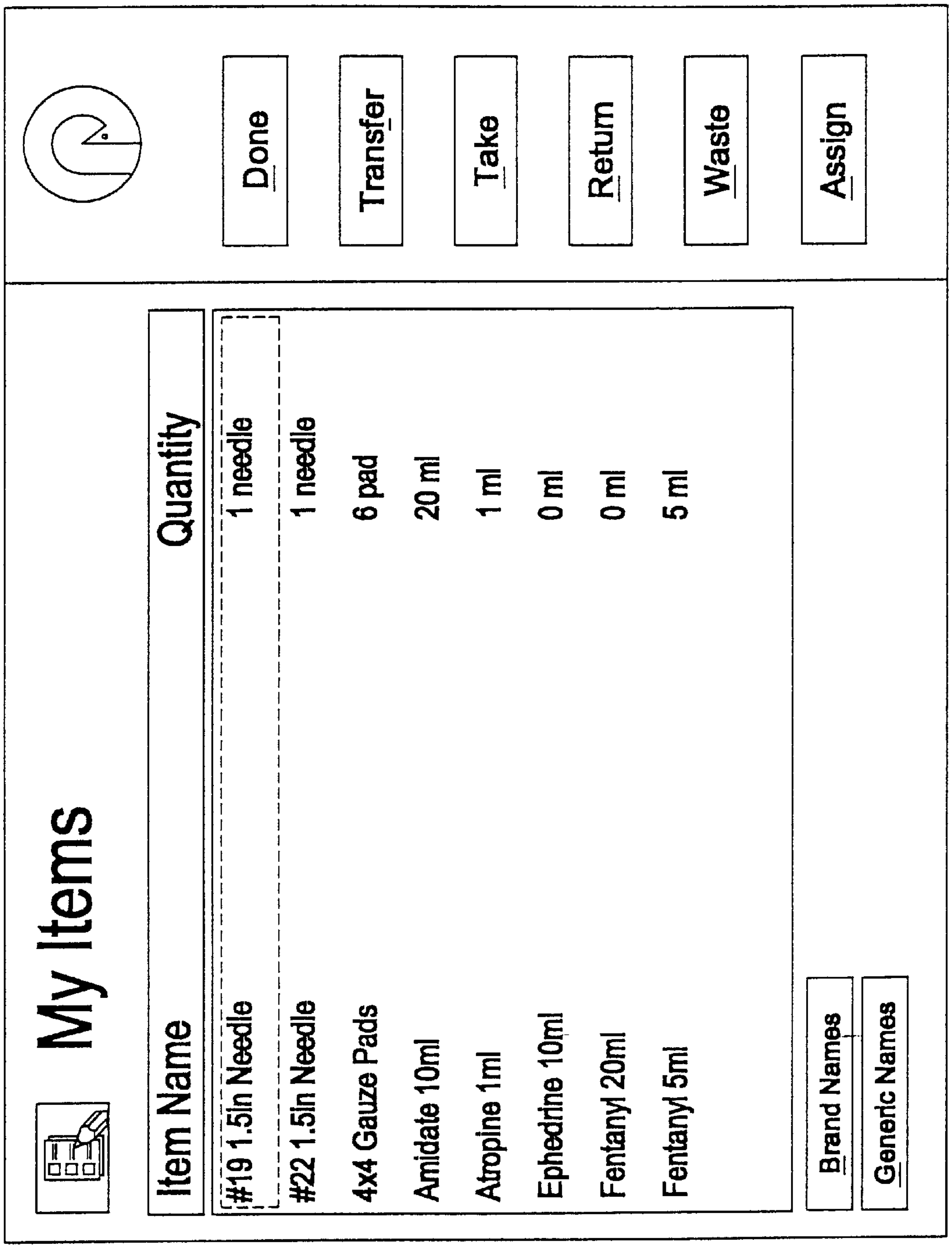
FIG. 12 is an example of a removed item list screen for a preferred embodiment of the present invention.

In step 518, the reconciliation or documentation procedure is performed. As shown in FIG. 5, the anesthesiologist may reach this function by selecting "My Items" or "Take" from the main menu 502 or from a Case Summary 512. To reconcile usage, the anesthesiologist begins by reviewing a list of items that are in his or her possession (i.e., that have been associated with his or her identifier) that have been removed from the cart, but have not been assigned to a case, returned to the pharmacy, wasted, or transferred to another anesthesiologist. An example of a "My Items" list for a preferred embodiment of the present invention is shown in FIG. 12. Quantities of each item are also shown. From the earlier example, a 10 ml vial of Amidate may be represented on the screen as 10 ml rather than one vial of Amidate. From this list, the anesthesiologist informs the system as to where each dose of every medication goes. Once an item from the list is chosen, the anesthesiologist is prompted for the dosage amount, the administration time (default to current time), the amount wasted, the amount returned, and/or the amount transferred. Any remaining amount is assumed to still be in the anesthesiologist's possession. After each medication is accounted for, the list of removed items is redisplayed until all items have been accounted for. If there are no items outstanding (i.e., no items are in the doctor's possession and still associated with his or her identifier), the anesthesiologist may logoff the system.

Figure 13:
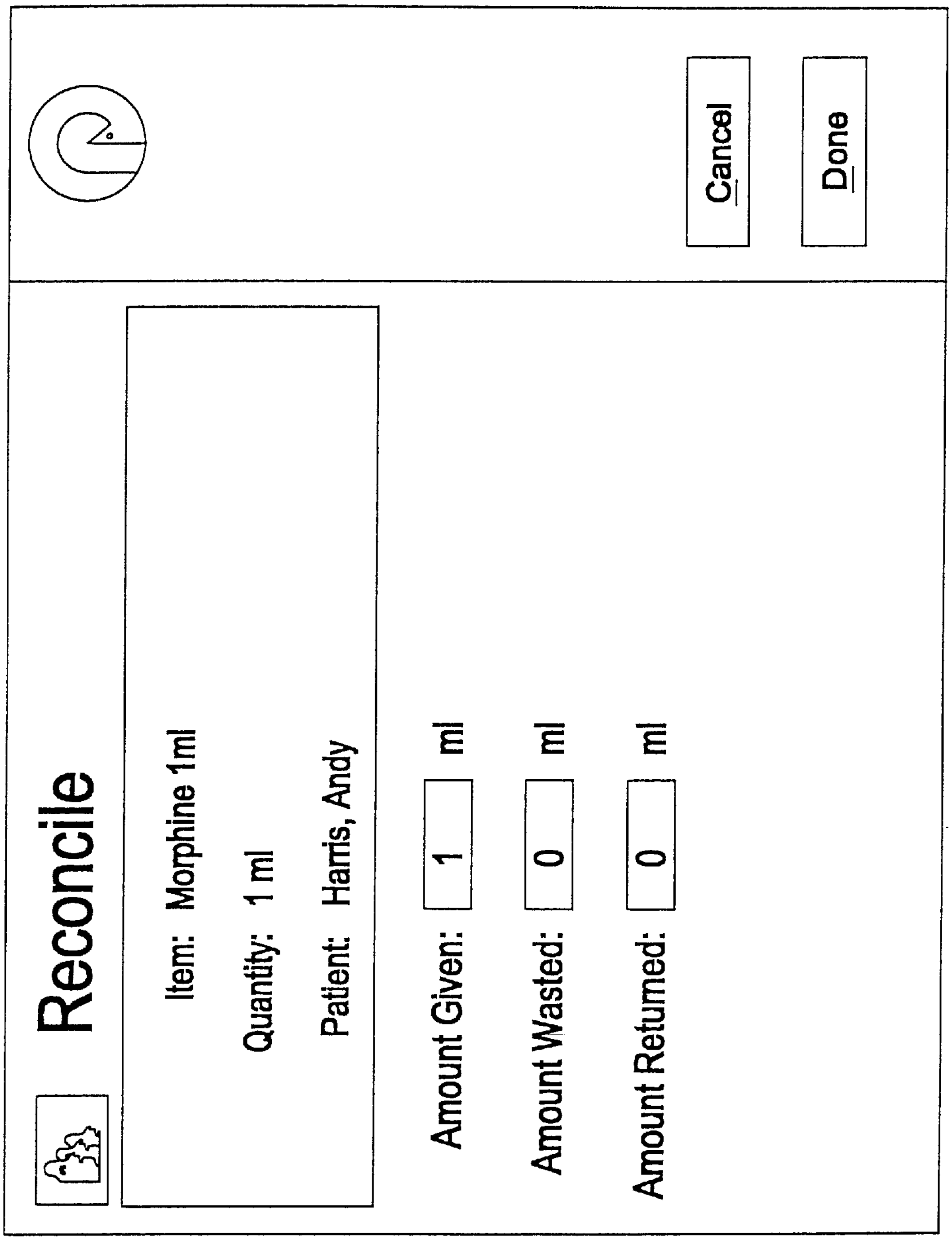
FIG. 13 is an example of a reconcile screen for a preferred embodiment of the present invention.

In step 520, items are assigned thus indicating that medications were actually administered to a patient. The amount of medication actually administered to the patient is recorded. An example of a "Reconcile" screen for a preferred embodiment of the present invention is shown in FIG. 13. Referring again to FIG. 5, first, the system determines whether a case is open (step 522). If a case is open, in step 512, the anesthesiologist may review the case summary and proceed to step 514 to assign items and/or kits. The case information may be displayed at the bottom of the screen. If a case is not open, in step 504, the anesthesiologist may review a list of cases as explained above.

In addition to assigning items to a case (i.e., indicating that medications were actually administered to a patient), items may be returned to the pharmacy, wasted, or transferred to another anesthesiologist (step 524). For the transfer function, the accepting anesthesiologist, preferably, is required to enter an ID and password to confirm the transfer. Items may be returned, wasted, or transferred at any time although preferably, they are returned, wasted, or transferred after the patient procedure is finished.

Once items have been documented (which includes assigning, returning, wasting, or transferring), they no longer appear in the list of medications removed by the anesthesiologist and are no longer considered to be in the possession of the anesthesiologist. Documentation, which includes assigning, returning, or wasting items, may be performed at any time on an open case. Preferably, multiple cases may be open at a time. The documentation procedure is automatically activated when the items are assigned to a case.

The process of wasting medications or supplies is a matter of hospital and JCAHO policy. Federal regulations require a witness to be present when a narcotic medication is wasted. The system requires a witness identifier (e.g., name or code of a witness to the wasting transaction) before recording a narcotic waste transaction. If all wastes are saved until the case is completed, a single witness identifier may be entered for all wastes that the anesthesiologist performs. Returned medications may be made available to the pharmacy for inspection. The pharmacy may then determine whether the returned medication may be used. These wasted transactions may be saved at the pharmacy system and reconciled manually with the physically returned and wasted medications.

Figure 14A:
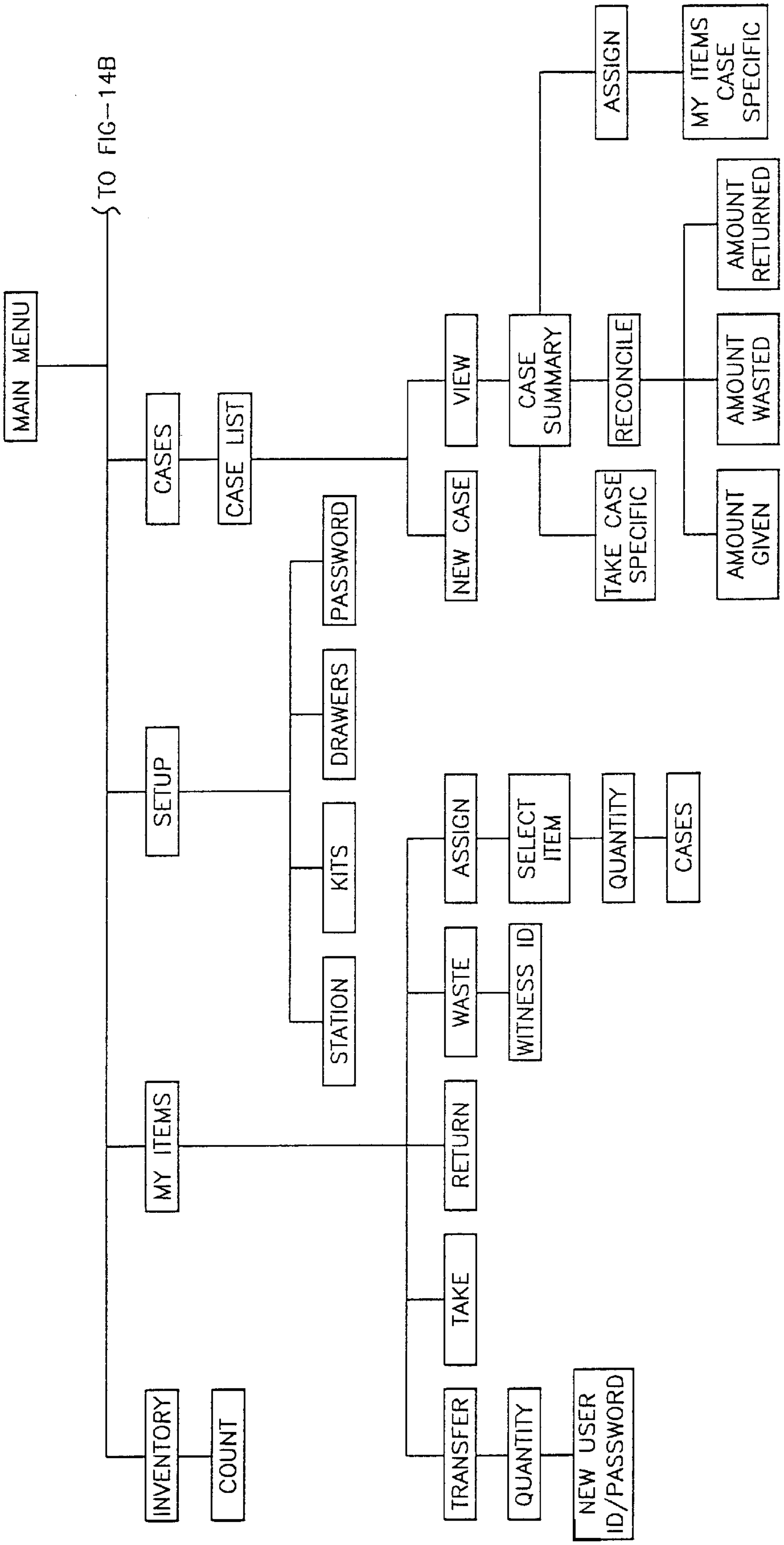
FIG. 14 is an example of a detailed functional organization chart for a preferred embodiment of the present invention.
Figure 14B:
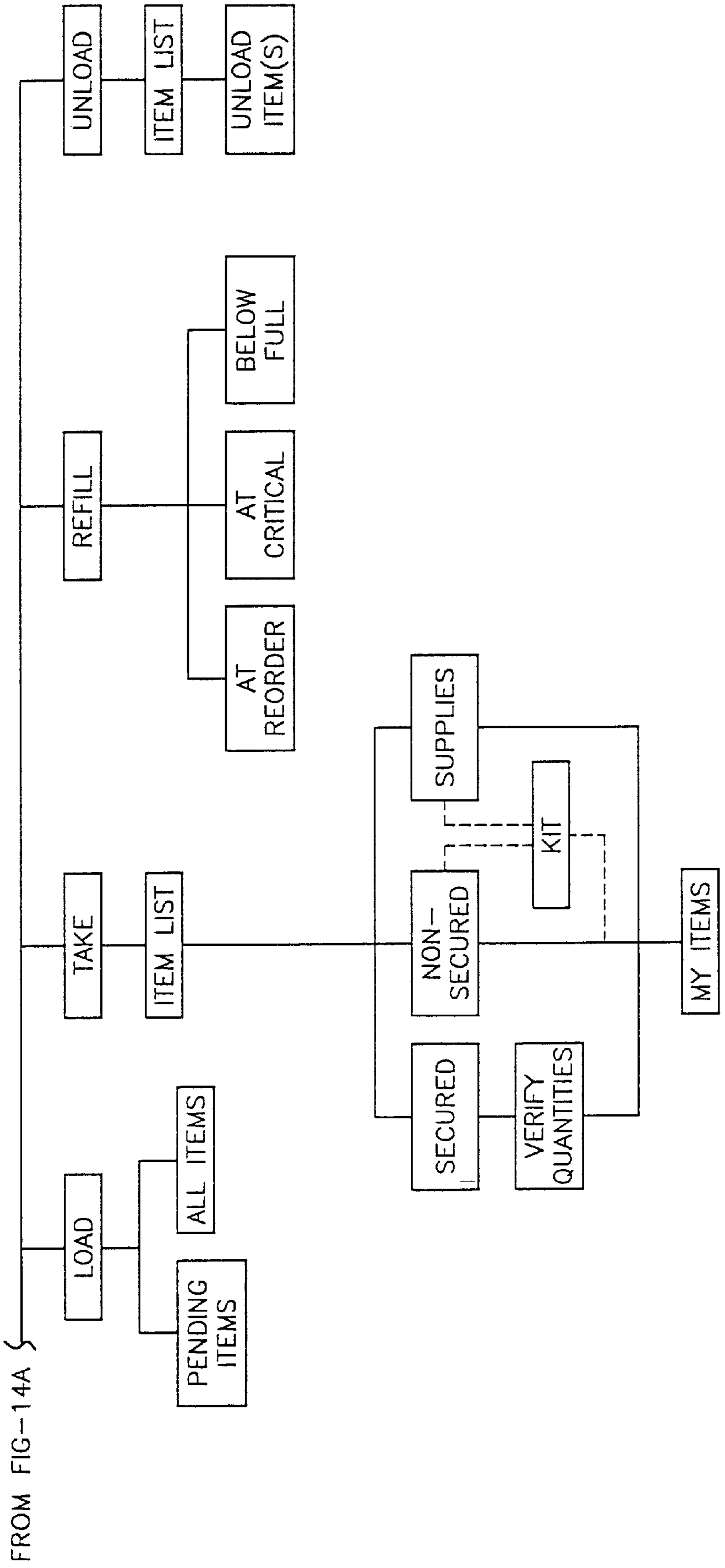

Referring to FIG. 14, a complete list of the functions of the present invention is shown. In addition to operating as an administration tool, the present invention may be used for inventory control. In a preferred embodiment, the present invention supports three "refill" modes. Item counts are tracked as items are removed from the cart. The system preferably informs the anesthesiologist when certain items are at or below a reorder point, at or below a critical low level, and below the full level. The system may further be designed to accept a refill amount to be delivered which may or may not correspond to the prior "full" level. When used for inventory control, the system may include a feature in which the pharmacy or materials management is alerted regarding items in the cabinet that need to be refilled.

Figure 15:
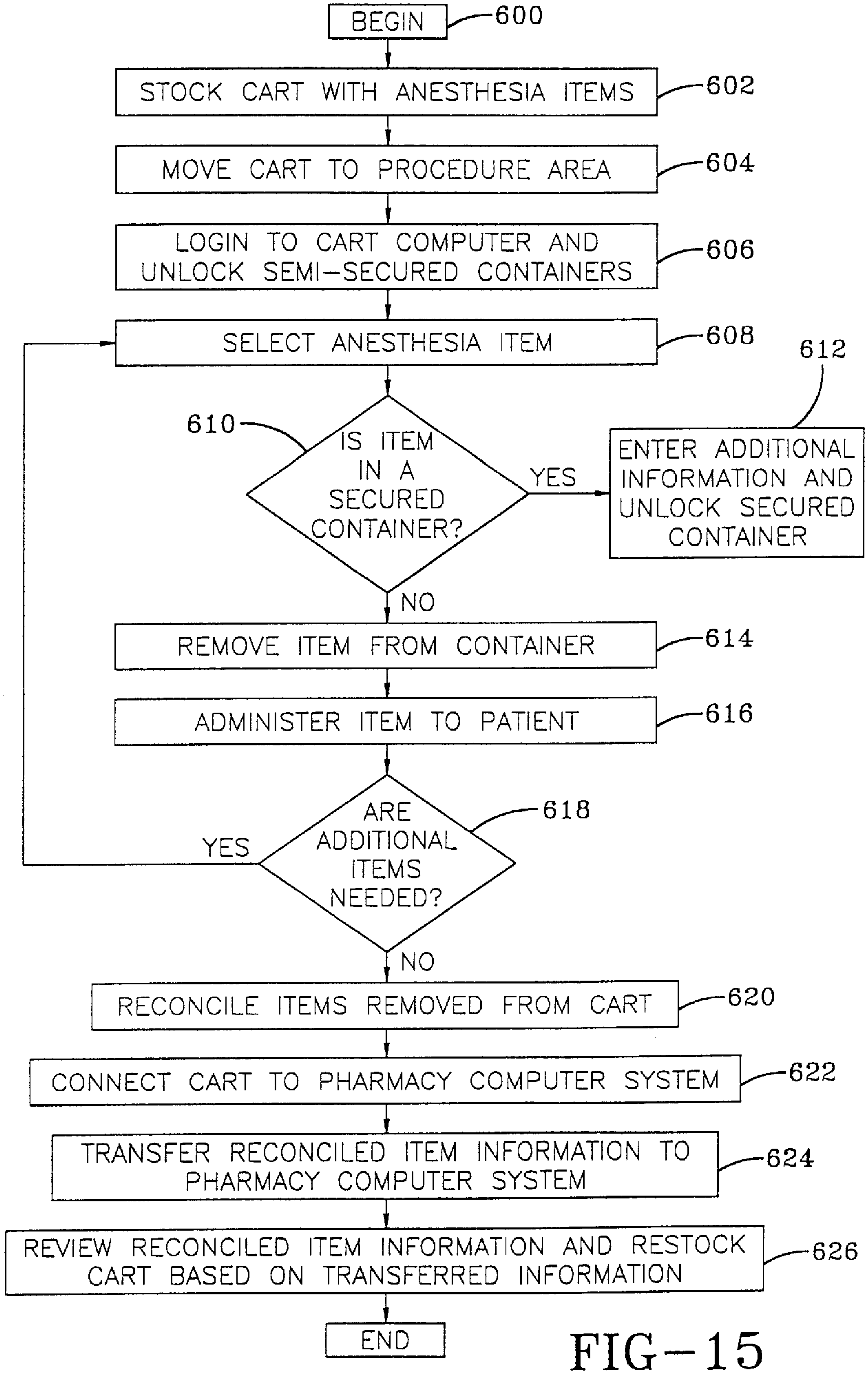
FIG. 15 is a flowchart for the overall operation of the anesthesia cart for a preferred embodiment of the present invention.

Referring to FIG. 15, a flowchart of the overall operation of the anesthesia cart for a preferred embodiment of the present invention is shown. As explained previously, the anesthesia cart may operate in conjunction with a pharmacy computer system so that inventory control functions may be performed. To begin the process (step 600), the cart is stocked with anesthesiology items. As indicated above, the anesthesiology items may include narcotic and non-narcotic medications as well as supplies. In addition, individual items may be packaged and loaded into the cart as kits. All items that are required by the anesthesiologist to perform his or her job may be packaged (e.g., into kits) and loaded into the cart. In this respect, the cart contents may be tailored or personalized for a particular anesthesiologist. Items may be loaded into secured, semi-secured, and unsecured containers as required and depending upon how the cart has been configured. Stocking may be performed by the pharmacy or any department responsible for anesthesiology items.

In the next step (step 604), the cart may be moved to an area in which a procedure may be performed on a patient. The anesthesiologist then logins into the cart computer (step 606). Preferably, the semi-secured containers are then unlocked. In the next step, the anesthesiologist then decides which item should be removed for the procedure and selects the required item (step 608). If the selected item is in a secured container (step 610), the anesthesiologist may be prompted for additional information to access the contents of the secured container. In step 612, the anesthesiologist enters the required information and the secured container is unlocked. If the selected item is not in a secured container, the anesthesiologist may simply remove the item from the semi-secured or unsecure container. In step 614, the item is removed from the container. In step 616, the anesthesiologist administers the medication to the patient or otherwise uses the item as appropriate for the procedure. In step 618, the anesthesiologist decides whether additional items are necessary to complete the procedure. If the anesthesiologist is ready to start performing another procedure while completing the current procedure, he or she may start the process of removing items for the next procedure. The anesthesiologist is not restricted to removing items for only the current procedure. As explained previously, the anesthesiologist may elect to have all items removed assigned to an open case, but is not required to do so. If the anesthesiologist would like to remove additional items, he or she returns to step 608.

If the anesthesiologist has completed the procedure or has otherwise determined that no additional items are required at the present time, the process of documenting usage or reconciling items may begin (step 620). Items that have been removed from the cart, in this step, are assigned, returned, wasted, or transferred depending on whether the item was used and how it was used. When the documentation or reconciliation process is completed, the cart may be connected to the pharmacy computer system (step 622) so information regarding status of the items in the cart may be communicated to the pharmacy computer system (step 624). At this point, the pharmacy may determine whether all items have been accounted for and whether narcotic medications may still be in the possession of the anesthesiologist. In addition to supporting this important regulatory function, the pharmacy may also determine what items need to be restocked so the cart may be used again for additional procedures (step 626).

The present invention may be used as either an electronic medication administration record for anesthesia or a medication and supply accountability and inventory system. The system may be designed to accept administration information for each dosage of a medication given or a summation of all medications used. The former provides an accurate administration record while the latter provides an inventory record. In a preferred embodiment of the present invention, both methods are available as a configuration parameter. The hospital may then decide which method to use depending on the its needs and policies.

The present invention balances the need for anesthesiology item management with convenience and accessibility. The pharmacy's concerns regarding control are addressed as are the anesthesiologist's need for accessibility. The Anesthesia Cart is a fully integrated system that addresses the functional needs of anesthesiologists and closely complements their workflow. The Anesthesia Cart supports healthcare facilities in their efforts to comply with medication management regulations and reduces the potential for facilities to experience noncompliances. In addition, the data that may be obtained and analyzed from the system may be used to develop best practices for the facility.

Numerous modifications and variations in the invention are expected to occur to those skilled in the art upon considerations of the foregoing descriptions. Although described in relation for use by an anesthesiologist, it is understood that the present invention may be useful to surgeons and other physicians and technicians who administer certain types or categories of medications to patients. The invention should not be construed as limited to the preferred embodiments and modes of preparation described herein, since these are to be regarded as illustrative rather than restrictive.

What is claimed is:

1. An apparatus for storing, tracking, and documenting usage of anesthesiology items comprising:

a mobile cart having a plurality of containers at least one of said containers adapted to be secured for authorized access;

a plurality of anesthesiology items adapted for use during anesthetic procedures, resident in at least one of said containers;

a data entry device on said cart, said data entry device adapted to enable an individual administering anesthetic procedures to enter an identifier for said individual and information relevant to a selected anesthesiology item, adapted to associate said identifier with said selected anesthesiology item, and adapted to enable an individual to enter data relevant to a procedure involving the use of an anesthetic;

a lock in association with said at least one secured container and in electronic communication with said data entry device, said lock adapted to enable said container to be opened upon receiving said relevant information from said data entry device.

2. The apparatus of claim 1, wherein said containers include one or more of the group consisting of secured, semi-secured, and unsecured.

3. The apparatus of claim 1, wherein said containers are drawers and latched receptacles.

4. The apparatus of claim 3, wherein said latched receptacles are housed within said drawers.

5. The apparatus of claim 1, wherein said data entry device includes a rotating extension monitor stand.

6. The apparatus of claim 5, wherein said rotating extension monitor stand is equipped with a plurality of pivot points.

7. The apparatus of claim 1, wherein said anesthesiology items include one or more of the group consisting of narcotic medications, non-narcotic medications, and supplies.

8. A method for storing, tracking, and documenting anesthesiology items comprising the steps of:

(a) storing a plurality of anesthesiology items in containers in an anesthesia cart;

(b) providing a list of said anesthesiology items stored in said containers in said anesthesia cart;

(c) entering data relevant to a procedure involving the use of anesthetic;

(d) selecting for removal one of said plurality of anesthesiology items on said list;

(e) removing said selected anesthesiology item;

(f) defining a case; and (g) documenting usage of said anesthesiology item.

9. The method of claim 8, wherein the step of defining a case includes entering one or more of the group consisting of a patient identifier, a case type, and a case number.

10. The method of claim 8, wherein the step of documenting usage of said anesthesiology item occurs after the administration of said anesthesiology item to an anesthesia patient.

11. The method of claim 8, wherein the step of documenting usage comprises the steps of assigning a removed anesthesiology item to said case, returning at least a portion of said removed anesthesiology item to said anesthesia cart, or wasting said anesthesiology item.

12. The method of claim 11, wherein the step of assigning said removed anesthesiology item comprises the steps of selecting said case, entering a dosage amount, and entering a time of administration.

13. The method of claim 11, further comprising the step of transferring said removed anesthesiology item to another anesthesia cart.

14. The method of claim 8, further comprising the step of assigning said anesthesiology item to said case upon removal of said anesthesiology item from said anesthesia cart.

15. The method of claim 8, wherein said anesthesiology items include one or more of the group consisting of narcotic medications, non-narcotic medications, and supplies.

16. The method of claim 15, wherein said narcotic medications are stored in secured containers in said anesthesia cart.

17. The method of claim 15, wherein said non-narcotic medications are stored in semi-secured or unsecured containers in said anesthesia cart.

18. The method of claim 8, further comprising the step of monitoring the inventory stored in said anesthesia cart.

19. A system for storing, tracking, and documenting anesthesiology items comprising:

a cabinet for storing anesthesiology items in containers, said cabinet having a data entry device that is adapted to enable an individual to enter data in said data entry device relevant to a procedure involving the use of anesthetic;

a container control unit in communication with said containers for controlling access to said anesthesiology items in said containers;

an access control unit in communication with said container control unit for determining which of said anesthesiology items have been removed from said containers and documenting usage of said anesthesiology items removed from said containers after administration of said anesthesiology items to at least one anesthesia patient.

20. The system of claim 19, wherein said cabinet further comprises secured, semi-secured, and unsecured containers.

21. The system of claim 19, wherein said anesthesiology items are stored in kits.

22. The system of claim 21, wherein said kits are designed to be case-specific or user-specific.

23. The system of claim 19, wherein said access control unit documents usage of said anesthesiology items by storing case information and information regarding administration, return, and wasting of said anesthesiology items.

24. A method of administering anesthesia, comprising:

providing a mobile cart with containers, said mobile cart adapted to be freely moved apart from connections to a computer network;

stocking said containers in said cart with anesthesiology items;

providing a data processor with a data entry device on said cart;

providing electronic communication between said data processor and said containers to enable said containers to be opened upon entry of predetermined data;

entering data in said data entry device relevant to a procedure involving the use of anesthetic;

accessing one of said containers;

removing an anesthesiology item from said one of said containers;

administering said anesthesiology item to a patient; and entering data regarding said anesthesiology item administered to said patient through said data entry device.

25. The method of claim 24, further comprising:

moving said cart to an area where anesthetic is administered to a patient.

26. The method of claim 24, further comprising:

downloading said data regarding said anesthesiology item administered, to a pharmacy computer system.

27. The method of claim 24, further comprising:

providing an electronic viewing terminal on said cart, said viewing terminal electronically connected to said data processor.

28. The method of claim 27, further comprising:

providing a computer program operable on said data processor to query a health care provider through a user interface visible on said viewing terminal for data regarding said anesthesiology items, said anesthetic procedure, said patient, or said health care provider.

29. The method of claim 24, further comprising:

providing storage compartments on said cart.

30. The method of claim 24, wherein said cart is on wheels, rollers or casters.

31. The method of claim 24, wherein said containers are secured until required data is entered into said data processor.

32. The method of claim 24, wherein said containers automatically open upon entry of required data in said data processor.

33. The method of claim 24, wherein one of said containers automatically opens upon entry of required data in said data processor.

34. The method of claim 24, wherein said containers are drawers or latched receptacles.

35. The method of claim 34, wherein said containers comprise drawers containing latched receptacles.

36. The method of claim 24, wherein said containers contain unit dose packages of drugs.

37. The method of claim 24, wherein said containers contain only one type of anesthesiology item per container.

38. A system comprising:

a health care facility computer network; and a mobile cart including a data processor on said cart, said cart adapted to be supplied with anesthesiology items in containers on said cart, at said health care facility, said data processor adapted to be connected to said computer network and adapted to be disconnected from said computer network when said cart is moved to an area where anesthesiology items are administered, said data processor adapted for entry of data regarding anesthesiology items removed from said containers and adapted for entry of data relevant to a procedure involving the use of anesthetic even while said data processor is not connected to said computer network, said data transferred to said computer network when said data processor is connected to said computer network.

39. The system of claim 38, further comprising:

a touchscreen data entry terminal on said cart and connected to said data processor.

40. The system of claim 38, further comprising:

a security device in association with at least some of said containers on said cart to prohibit access to said at least some of said containers prior to entry of required data in said data processor.

41. The system of claim 40, wherein said security device is an electronically operable lock in communication with said data processor.

42. The system of claim 38, wherein each of said containers are loaded with anesthesiology items in an ordered fashion and the contents of each container is input into a computer memory prior to said anesthesiology items being administered.

43. The system of claim 42, wherein said computer memory is in said computer network.

44. The system of claim 42, wherein said computer memory is in said data processor.

45. The system of claim 38, wherein said data processor is adapted to perform inventory control functions.

* * * * *